(12) United States Patent
Kipnis (10) Patent No.: US 10,773,677 B1
(45) Date of Patent: Sep. 15, 2020

(54) AIRBAG SYSTEM WITH OVERLAPPING AIRBAGS

(71) Applicant: Cyclazoom LLC, Evanston, IL (US)

(72) Inventor: Michael Kipnis, Wheeling, IL (US)

(73) Assignee: Cyclazoom LLC, Evanston, IL (US)

( * ) Notice: Subject to any disclaimer, the term of this patent is extended or adjusted under 35 U.S.C. 154(b) by 0 days.

(21) Appl. No.: 16/117,555

(22) Filed: Aug. 30, 2018

Related U.S. Application Data (63) Continuation-in-part of application No. 15/612,566, filed on Jun. 2, 2017, now Pat. No. 10,065,595.

(60) Provisional application No. 62/344,815, filed on Jun. 2, 2016.

(51) Int. Cl.
| | |
|---|---|
| *B60R 21/231* | (2011.01) |
| *B60R 21/26* | (2011.01) |
| *B60R 21/215* | (2011.01) |
| *B60R 21/00* | (2006.01) |

(52) U.S. Cl.
CPC .......... *B60R 21/215* (2013.01); *B60R 21/231* (2013.01); *B60R 21/26* (2013.01); *B60R 2021/0032* (2013.01); *B60R 2021/23107* (2013.01)

(58) Field of Classification Search
CPC . B60R 21/203; B60R 21/2334; B60R 21/233; B60R 2021/23107; B60R 2021/23308; B60R 2021/23386; B60R 2021/23571
See application file for complete search history.

(56) References Cited

U.S. PATENT DOCUMENTS

| | | | |
|---|---|---|---|
| 3,840,246 A | 10/1974 | McCullough, Jr. et al. | |
| 3,843,150 A * | 10/1974 | Harada | B60R 21/231 280/729 |
| 4,136,894 A | 1/1979 | Ono et al. | |
| 4,215,878 A | 8/1980 | Hirbod | |
| 4,449,728 A | 5/1984 | Pilatzki | |
| 4,877,264 A | 10/1989 | Cuevas | |
| 5,158,323 A | 10/1992 | Yamamoto et al. | |
| 5,529,337 A | 6/1996 | Takeda et al. | |
| 5,779,261 A | 7/1998 | Honda | |
| 5,839,754 A * | 11/1998 | Schluter | B60R 21/2644 280/736 |
| 5,865,466 A | 2/1999 | Yamamoto et al. | |
| 5,967,549 A | 10/1999 | Allen et al. | |
| 6,139,052 A | 10/2000 | Preamprasitchai | |

(Continued)

FOREIGN PATENT DOCUMENTS

WO    2017146439 A1    8/2017

*Primary Examiner* — Barry Gooden, Jr.
(74) *Attorney, Agent, or Firm* — Brian Roffe (57) ABSTRACT

Vehicular airbag system includes a holder, airbag assemblies each having at least one inflatable airbag, and support brackets arranged on the holder. Each support bracket retains an airbag assembly. The support brackets have different heights relative to a plane defined by or through the holder and are positioned relative to one another such that the airbags inflate at different heights relative to the plane and an airbag inflating at a greatest height from the plane overlies at least one other airbag closer to the plane. The holder may form a housing with a cover that is broken or displaced during airbag deployment, with the support brackets and airbag assemblies being situated in a chamber defined in the housing between the holder and the cover.

22 Claims, 10 Drawing Sheets

(56) References Cited

U.S. PATENT DOCUMENTS

| | | |
|---|---|---|
| 6,308,983 B1 | 10/2001 | Sinnhuber |
| 6,419,262 B1 | 7/2002 | Fendt et al. |
| 6,439,605 B2 | 8/2002 | Anyoshi |
| 6,702,320 B1 | 3/2004 | Lang et al. |
| 6,866,291 B2 | 3/2005 | Abe et al. |
| 7,111,866 B2 | 9/2006 | Abe et al. |
| 7,125,073 B2 | 10/2006 | Yoshida |
| 8,985,622 B1 | 3/2015 | Cannon |
| 9,227,587 B1 | 1/2016 | Belwafa et al. |
| 9,358,945 B2 | 6/2016 | Yamada et al. |
| 9,522,648 B2 | 12/2016 | Fukawatase |
| 9,550,469 B2 | 1/2017 | Sato et al. |
| 9,566,929 B1 | 2/2017 | Belwafa et al. |
| 9,731,677 B1 | 8/2017 | Belwafa et al. |
| 9,758,121 B2 | 9/2017 | Paxton et al. |
| 9,802,568 B1 * | 10/2017 | Larner |
| 10,065,595 B1 * | 9/2018 | Kipnis ................ B60R 21/2334 |
| 2007/0126217 A1 | 6/2007 | Nayef |
| 2017/0369019 A1 | 12/2017 | Jeong et al. |
| 2018/0126941 A1 * | 5/2018 | Faruque ................ B60R 21/207 |
| 2018/0361981 A1 * | 12/2018 | Faruque ................ B60R 21/261 |
| 2019/0111878 A1 * | 4/2019 | Faruque ................ B60R 21/02 |

* cited by examiner

AIRBAG SYSTEM WITH OVERLAPPING AIRBAGS

CROSS-REFERENCE TO RELATED APPLICATIONS

This application is a continuation-in-part of U.S. patent application Ser. No. 15/612,566 filed Jun. 2, 2017, now U.S. Pat. No. 10,065,595, which claims priority of U.S. provisional patent application Ser. No. 62/344,815 filed Jun. 2, 2016, both of which are incorporated by reference herein.

FIELD OF THE INVENTION

This invention is generally related to airbag deployment systems for vehicles and more specification to an arrangement of airbags configured to enable varied and optimized deployment in the event of an accident involving the vehicle for which airbag deployment is warranted and which is tailored to the occupant or other object to be protected by the deploying airbags.

SUMMARY OF THE INVENTION

One embodiment of a vehicular airbag system for an occupant in accordance with the invention includes a holder, airbag assemblies each having an inflatable airbag, and support brackets arranged on the holder. Each support bracket retains one of the airbag assemblies. The support brackets have different heights relative to a plane defined by or through the holder and are positioned relative to one another such that the airbags inflate at different heights relative to the plane and an airbag inflating at a greatest height from the plane overlies at least one other airbag closer to the plane.

In one embodiment, a housing is provided and includes a cover. A chamber is defined between the cover and the holder, and the support brackets and the airbag assemblies are situated in the chamber. The holder may include a uniformly planar surface defining the plane, in which case, the support brackets have the different heights relative to the planar surface of the holder such that the airbags inflate at the different heights relative to the planar surface.

Further objects and advantages of this invention will become apparent from a consideration of the included figures with corresponding description.

BRIEF DESCRIPTION OF THE DRAWINGS

The invention, together with further advantages thereof, may best be understood by reference to the following description taken in conjunction with the accompanying drawings, wherein like reference numerals identify like elements, and wherein.

DETAILED DESCRIPTION OF THE INVENTION

Figure 1:
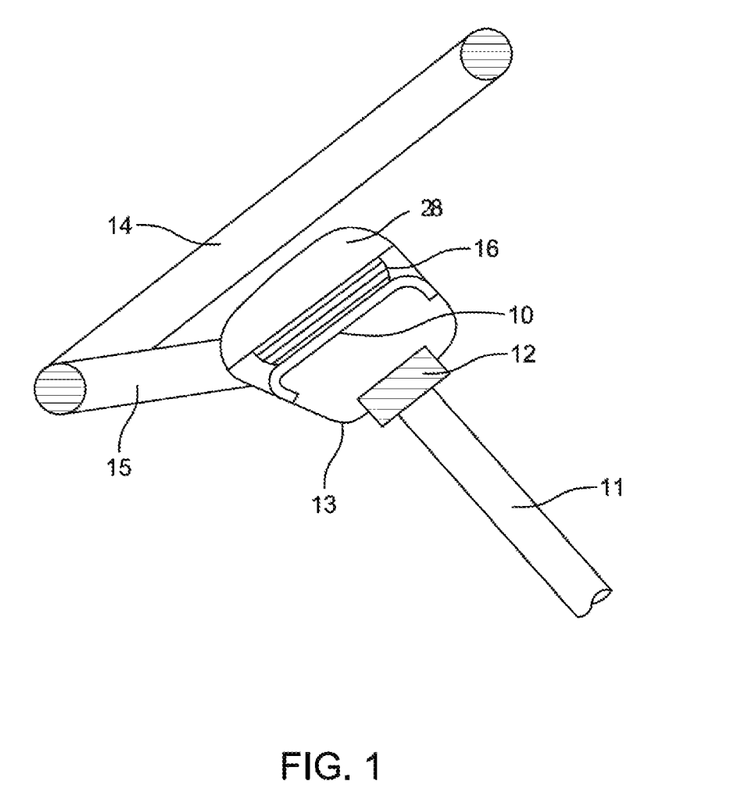
FIG. 1 is a cross-sectional view of a conventional airbag assembly incorporated into a steering wheel.

Referring to the accompanying drawings wherein like reference numbers refer to the same or similar elements, FIG. 1 shows conventional positioning of an airbag assembly incorporated into a steering wheel assembly that is typically provided in various vehicles. The steering wheel assembly comprises a steering column 11 mounted to a frame of the vehicle in a known manner, e.g., to enable it to rotate relative to the frame of the vehicle and cause a change in the direction in which one or more steered wheels on the vehicle are oriented. The steering wheel assembly also comprises a steering wheel 14 having, for example, an annular frame and one or more sprockets 15 connecting the annular frame to a core or hub 13, which is also part of the steering wheel assembly. A connector 12 connects the steering column 11 to the core 13.

The foregoing description of a steering wheel assembly is commonly conventionally found in vehicles and serves as the basis for an explanation of the invention. It should be understood that the invention is not limited to the steering wheel assembly shown in FIG. 1 and the invention may be incorporated into variants of the steering wheel assembly shown in FIG. 1. The invention may thus be considered as that part of the arrangement aside from the steering column, in which case, the invention is attached to a steering column for use. It may also be considered to encompass the steering column.

The invention entails housing an airbag assembly 28 in the core 13, an airbag inflator system 16 behind the airbag assembly 28, and a holder 10 that retains the airbag inflator system 16 in the core 13. Airbag inflator system 16 includes, as known to those skilled in the airbag field, inflation medium, e.g., pressurized gas, or means for generating inflation medium which inflation medium is provided to the airbag assembly 28 to inflate the airbags in the airbag assembly 28, discussed below.

Figure 2:
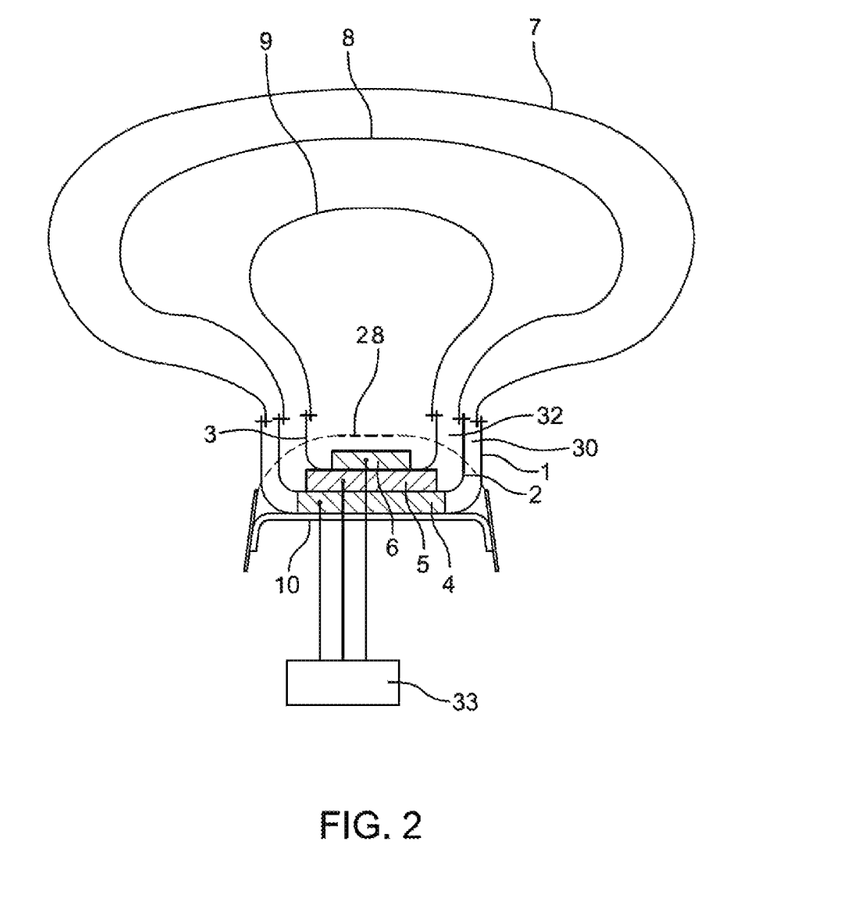
FIG. 2 is a cross-section of a first embodiment of a deployed airbag in accordance with the invention.

FIG. 2 shows one particular configuration of the airbag assembly 28 which comprises a plurality of airbags and means for independently or individually inflating each airbag. More specifically, the illustrated embodiment of the airbag assembly 28 includes an outermost airbag 7, an intermediate airbag 8 and an innermost airbag 9. Airbags 7, 8, 9 are nested so that airbag 8 is in the interior of airbag 7 and airbag 9 is in the interior of airbag 8.

Retainers 1, 2, 3 are provided to retain the airbags 7, 8, 9, respectively. Each retainer 1, 2, 3 has a general cup-shape and is open at an upper end. Each retainer 1, 2, 3, is therefore defined basically by a generally circular lower wall and a side wall extending upward from an outer edge of the lower wall. The side wall is shown as being generally tubular but other shapes for the side wall are possible and encompassed within the scope and spirit of the invention.

Retainer 1 is the retainer closest to the steering column 11, and has an inflator system 4 on its upper surface. Retainer 1 is preferably attached to the holder 10. Inflator system 4 is part of the airbag inflator system 16 and is configured to inflate the outermost airbag 7 which is attached to the retainer 1, e.g., via the side wall. Attachment of the airbag 7 to the retainer 1 may be by any means known to those skilled in the art to which this invention pertains.

Retainer 2 is mounted onto the inflator system 4 such that an annular space 30 is formed between the side walls of retainers 1 and 2. The annular space 30 is necessary to allow for flow of inflation medium generated by inflator system 4 into a space between airbags 7 and 8 to thereby cause inflation of airbag 7. Inflator system 5 is part of the airbag inflator system 16 and is configured to inflate the intermediate airbag 8 which is attached to the retainer 2, e.g., via the side wall. Attachment of the airbag 8 to the retainer 2 may be by any means known to those skilled in the art to which this invention pertains.

Retainer 3 is mounted onto the inflator system 5 such that an annular space 32 is formed between the side walls of retainers 2 and 3. The annular space 32 is necessary to allow for flow of inflation medium generated by inflator system 5 into a space between airbags 8 and 9 to thereby cause inflation of airbag 8. Inflator system 6 is part of the airbag inflator system 16 and is configured to inflate the innermost airbag 9 which is attached to the retainer 3, e.g., via the side wall. Attachment of the airbag 9 to the retainer 3 may be by any means known to those skilled in the art to which this invention pertains.

FIG. 2 also shows that the inflator systems 4, 5, 6 are housed within a cover of the airbag assembly 8, shown in dotted lines in FIG. 2. Airbags 7, 8, 9 are folded in a manner known to those skilled in the art into the housing of the airbag assembly 28 that is arranged in the core 13. A housing on the steering wheel therefore includes the retainers 1, 2, 3, inflator system 16 having inflator systems 4, 5, 6, folded airbags 7, 8, 9, and a holder 10 to which the retainer 1 is attached.

A control system 33 is also provided to manage activation of the inflator systems 4, 5, 6 to effect a desired manner of inflation described below. Control system 33 is coupled to each inflator system 4, 5, 6, e.g., by a wire, and can activate the inflator systems 4, 5,6 by directly an inflation signal to the inflator systems 4, 5, 6, The inflation system can cause ignition of an igniter material/propellant or release of inflation medium from a source thereof.

FIG. 2 illustrates a concept of providing multiple inflator systems 4, 5, 6, each activatable in a conventional manner to inflate a respective one of a plurality of nested airbags. By nested airbags as used herein, it means that each airbag, aside from an outermost airbag, is configured to inflate within one or more overlying airbags. Thus, in the illustrated embodiment, airbag 8 inflates within airbag 7, and airbag 9 inflates within airbag 8 which in turn inflates within airbag 7. Airbags 7 and 8 thus overlie airbag 9.

In a particularly beneficial embodiment, the invention configures activatable inflator systems 4, 5, 6 with different inflation parameters to provide a varying speed of inflation. Inflator system 6 is configured to be activated in order to inflate airbag 9 at the highest speed of inflation, e.g., provide for the higher rate of inflow of inflation medium into the airbag 9. Inflator system 5 is configured to be activated to inflate airbag 8 at a lower speed of inflation than the inflation speed at which inflator system 6 inflates airbag 9, e.g., provide for a lower rate of inflow of inflation medium into the airbag 8. Inflator system 4 is configured to be activated to inflate airbag 7 at a lower speed of inflation than the inflation speed at which inflator system 5 inflates airbag 8, e.g., provide for a lower rate of inflow of inflation medium into the airbag 7. This decrease in inflation speed relative to the nested position of the airbags 7, 8, 9, is extremely advantageous because the impact of the outermost airbag 7 against the occupant sought to be protected by the inflating airbag is muted from what the force would be if a single airbag is inflated. A single inflator airbag system results in a significant impact against the occupant potentially injuring the occupant.

Inflation speed may therefore be considered the rate at which the inflation medium is directed into the airbag. It is dependent on the manner in which the inflation medium is generated or provided, and may be dependent on, for example, the burning rate of propellant, and/or the opening of a valve that controls inflow of pressurized gas. Any number of known techniques to control inflation speed may be applied in the invention and all are considered to be within the scope and spirit of the invention.

By contrast, in accordance with the invention, the variably inflated, multiple airbags results in the innermost airbag being inflated first, then the sequentially overlying airbags in a relative gentle, but potentially rapid progression. Depending on the parameters of the crash, the occupant may impact the outermost airbag 7 at a time when only the innermost airbag 9 has fully inflated, and airbags 7 and 8 are only partly inflated. This however will still protect the occupant and prevent them from impacting the steering wheel 14. Similarly, the occupant may impact the outermost airbag 7 at a time when only the innermost airbag 9 and the middle or intermediate airbag 8 have fully inflated, and outermost airbag 7 is only partly inflated. This however will also protect the occupant and prevent them from impacting the steering wheel 14. Finally, the occupant may impact the outermost airbag 7 at a time when all of the airbags 7, 8, 9 have fully inflated, which will obviously provide protection.

Thus, by staggering the time at which the airbags 7, 8, 9 are fully inflated, a better cushioning effect is provided by the invention.

It is possible to provide any number of airbags, each with its own dedicated inflator system. The use of three airbags is only the illustrated embodiment, and any number of nested airbags may be provided in accordance with the invention, whether two, four, or more than four.

There may be one or more innermost ones of the airbags. i.e., two airbags are at the center of the core or at the same smallest distance from a center of the core. In this case, one or both of the innermost ones of the airbags is inflated at the highest speed of inflation. Similarly, there may be one or more outermost ones of the airbags. i.e., two or more airbags are at the same largest distance from a center of the core. In this case, one, some or all of the outermost ones of the airbags is inflated at the lowest speed of inflation.

Control system 33 is provided with parameters of the crash and directs activation of the inflator systems 4, 5, 6 accordingly. A time-based inflation can be provided by the control system 33. Control system 33 could also potentially direct inflation of only one of the airbags 7, 8, 9 via its respective inflator system 4, 5, 6, even though multiple airbags and respective inflator systems are present.

Figure 3:
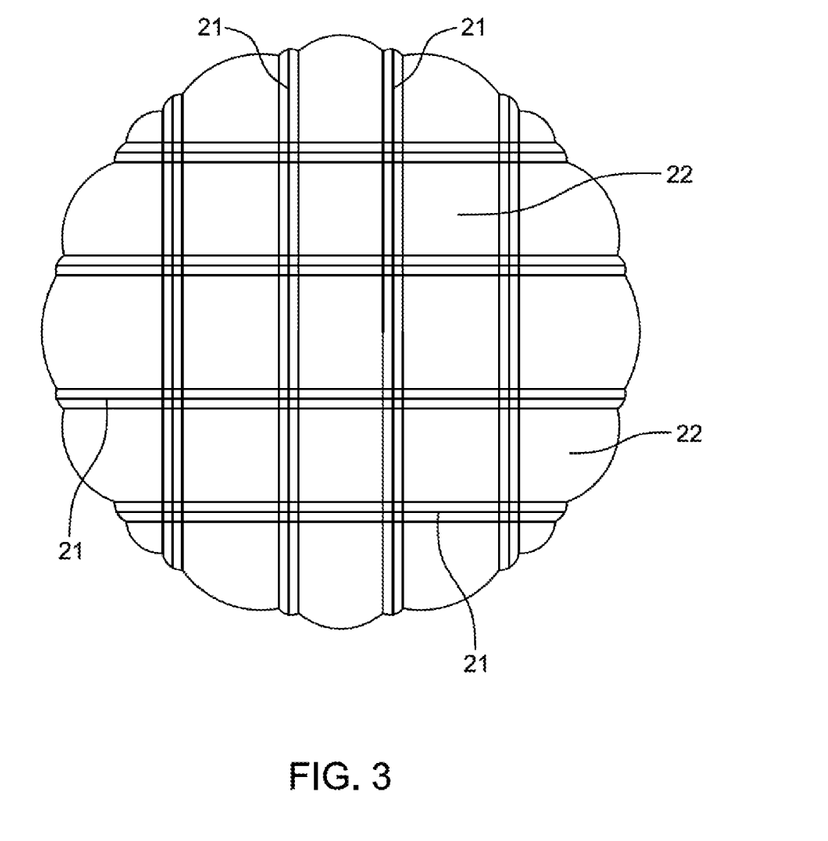
FIG. 3 is a front view of the first embodiment of the deployed airbag shown in FIG. 2.
Figure 4:
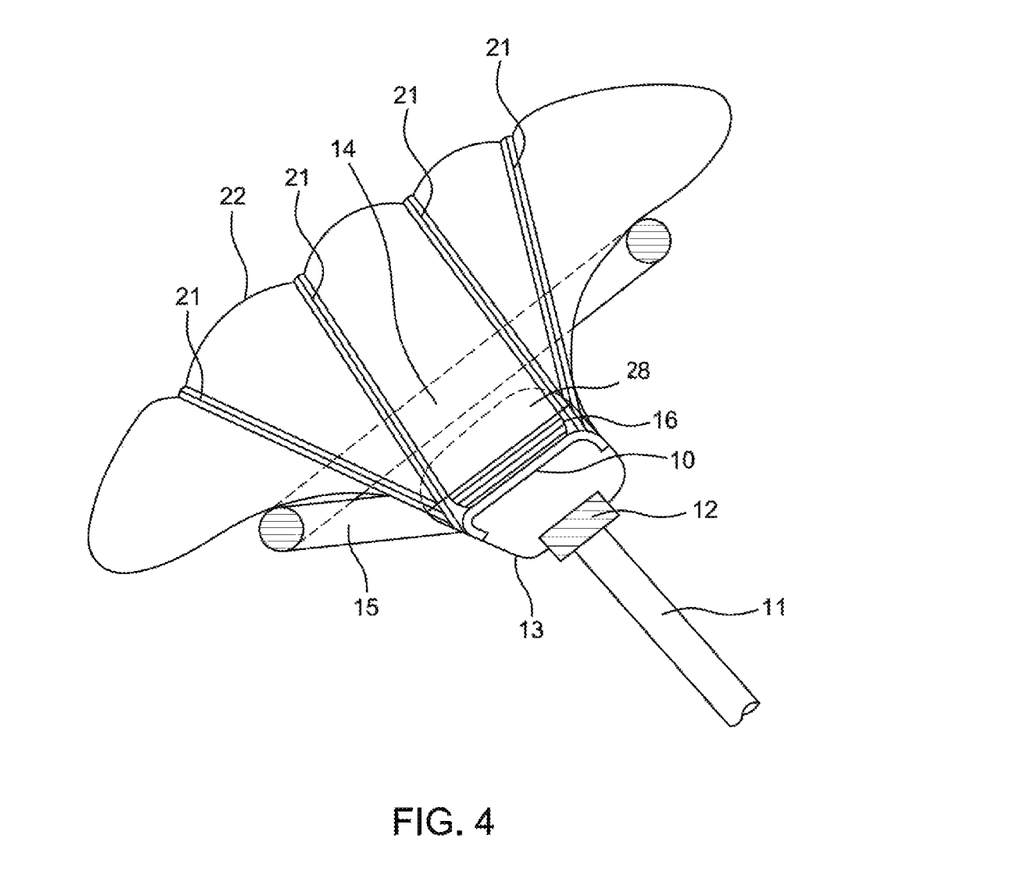
FIG. 4 is a side view of the deployed airbag shown in FIG. 3.

FIGS. 3 and 4 show the possibility of using belts 21 to limit the inflation of an airbag 22. If implemented with the airbag assembly shown in FIG. 2, the belts 21 would limit inflation of the outermost airbag 7. The belts 21 are each elongate and each end is securely attached to the core 13 or holder 10. The belts 21 may be made flexible and are housed in the housing on the core 13 before deployment of the airbags from the core 13. The belts 21 could also be inflexible and provided with their full length and folded into the core 13.

Upon inflation of the airbag or airbags from the core 13, the belts 21 expand but their expansion is limited to a predetermined distance from the steering wheel 14. This distance is determined based on, for example, the distance between the steering wheel 14 and the front surface of the driver's seat and typical characteristics of the occupant. Limiting expansion of the belts 21 is obtained by appropriate manufacture, e.g., provide a certain, limited degree of expansion.

The number and placement of the belts 21 can also vary depending on, for example, the size of the airbag 22. As shown in FIG. 4, there are a total of eight belts 21, four belts 21 are parallel to one another (extending from one side of the airbag to an opposite side-left to right in FIG. 3) and another four belts are parallel to one another and perpendicular to the other set of four belts 21 (extending from one side of the airbag to an opposite side-top to bottom in FIG. 3). Different angular configurations of sets of parallel belts 21 can also be used in the invention, other than perpendicular configuration.

Although the embodiment of FIGS. 3 and 4 is illustrated with respect to a driver's airbag inflating from the steering wheel assembly, the same use of belts may be applied to different airbag arrangements that do not necessarily deploy from a steering wheel assembly.

Figure 5:
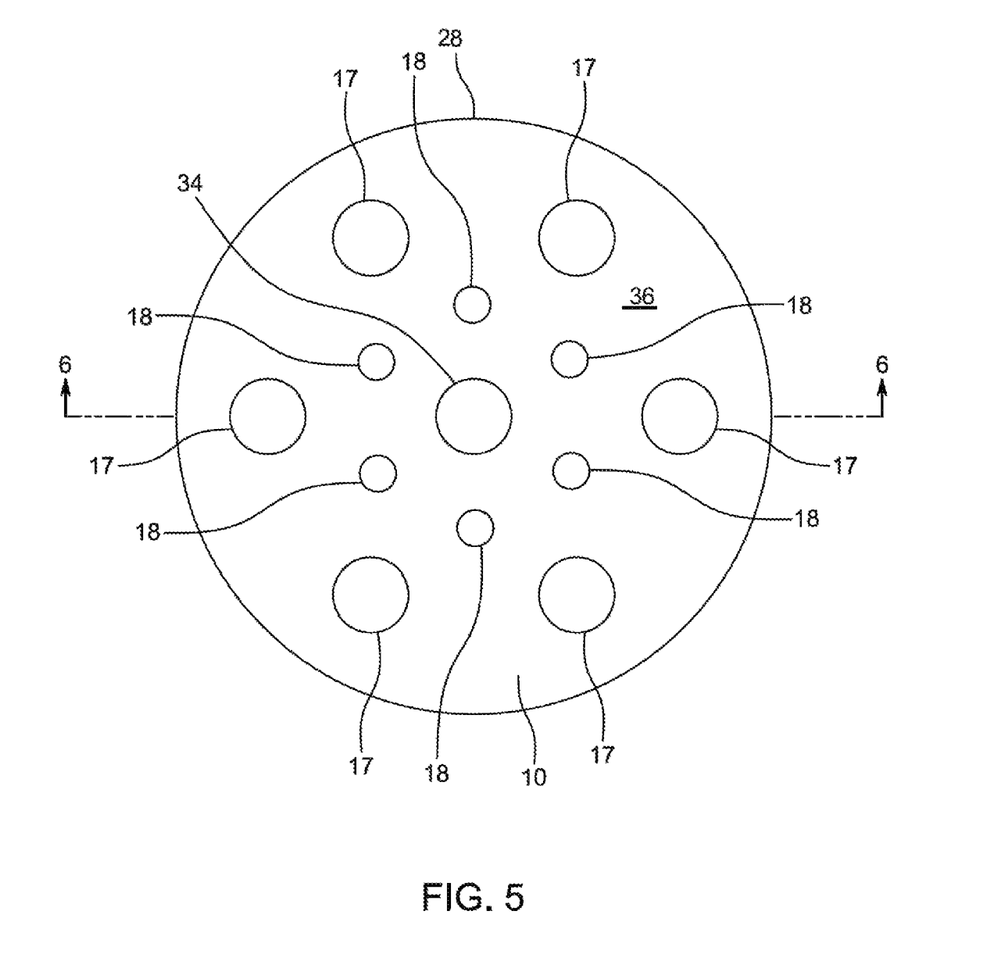
FIG. 5 is a view of an airbag assembly in accordance with the invention mounted on a steering wheel with the cover removed to show the positioning of the airbags.

Referring now to FIGS. 5-8, an embodiment of an airbag system is illustrated wherein different sized and shaped airbags are inflated. FIG. 5 shows a plurality of airbag assemblies 17, 18 arranged on the holder 10 of the airbag system 28 which is typically designed to protect a single occupant. Airbags 17A in airbag assemblies 17 are larger airbags that are configured to inflate into a generally triangular shape (see FIG. 7) while airbags 18A in airbag assemblies 18 are smaller airbags that are also configured to inflate into a generally triangular shape (see FIG. 7). A central airbag assembly 34 includes an airbag 34A that is configured to inflate into a circular shape (see FIG. 7). Each airbag assembly 17, 18, 34 also includes an inflator system controlled by a control system, not shown in this embodiment. The control system may be configured to inflate one (e.g., only airbag 34A via its inflator system), all of airbags 17A, 18A and 34A or any number therebetween.

Support brackets 20 are provided to support the airbag assemblies 17, 18, 34 vertically above the uniformly planar upper surface 36 of the holder 10. Also, each airbag assembly 17, 18, 34 includes an inflator to inflate the airbag thereof. By uniformly planar, it is meant that the upper surface 36 is flat. As an alternative to providing a flat upper surface, it is possible to provide the support brackets 20 at different heights relative to a common actual or virtual plane. An important aspect of this embodiment may be considered that, relative to a common plane a set distance from the center of impact of the airbags with the occupant, the airbags have their maximum inflation state at different distances from the common plane. Using the holder 10 with its uniformly planar upper surface 36 and different sized support brackets 20 attached to or integrated into this surface 36 or holder 10 is only one way to achieve this objective and other, equivalents ways are encompassed within the scope and spirit of the invention.

FIG. 5 shows a pattern in which the airbag assemblies 17, 18, 34 are arranged. In the center, there is the airbag assembly 34 which is configured to inflate as the uppermost airbag 34A (see FIG. 7). Outward from the support bracket 20 on which the central airbag assembly 34 is mounted, there are six support brackets 20 on which six airbag assemblies 18 are mounted. Outward from the six support brackets 20 on which the six airbag assemblies 18, there are six support brackets 20 in which six airbag assemblies 17 are mounted. The supports for airbag assemblies 17, 18 may be equiangularly distributed around the holder 10, i.e., angularly spaced apart from one another by the same angle, e.g. about 60 degrees by virtue of the presence of six support brackets 20.

There may be a different number of airbag assemblies 17, 18 and a corresponding number of support brackets 20.

Figure 6:
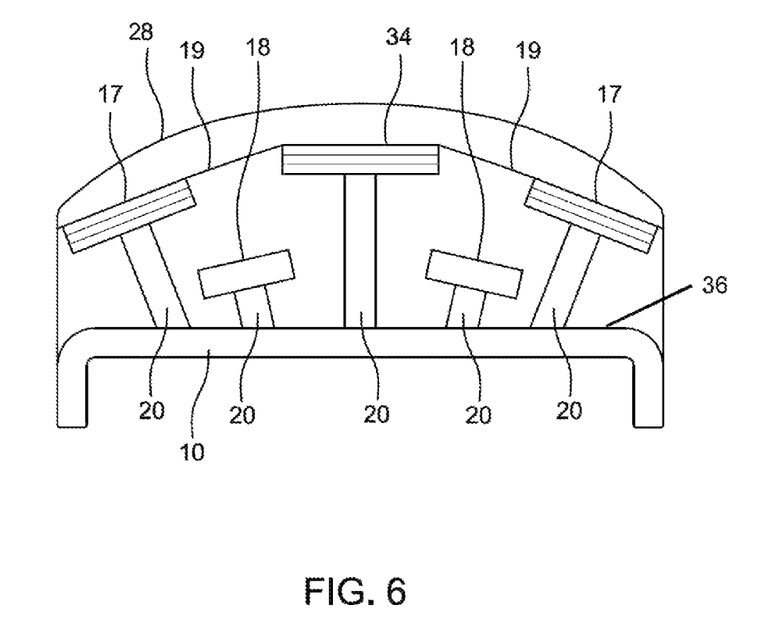
FIG. 6 is a cross-sectional view of the airbag assembly shown in FIG. 5 taken along the line 6-6 in FIG. 5.

FIG. 6 shows a housing 26 of the airbag system which defines an interior chamber between the holder 10 and a cover 38. The airbag assemblies 17, 18, 34 and the support brackets 20 are situated in this chamber. As shown, the upper surface of the airbag assemblies 17 and 34 abut against the inner surface of the cover 38, but this is not a requirement. By virtue of the enclosure of the airbag assemblies 17, 18, 34 in the chamber of the housing 26, this design is particularly suited for a single occupant airbag, i.e., an occupant in a single seating position of the vehicle. Thus, when the holder 10 is mounted on the steering wheel 14, the airbag system would protect only the driver of the vehicle. When the holder 10 is incorporated into a part of the vehicle in front of the front-seated passenger, then the airbag system would protect only the front-seated passenger.

Figure 7:
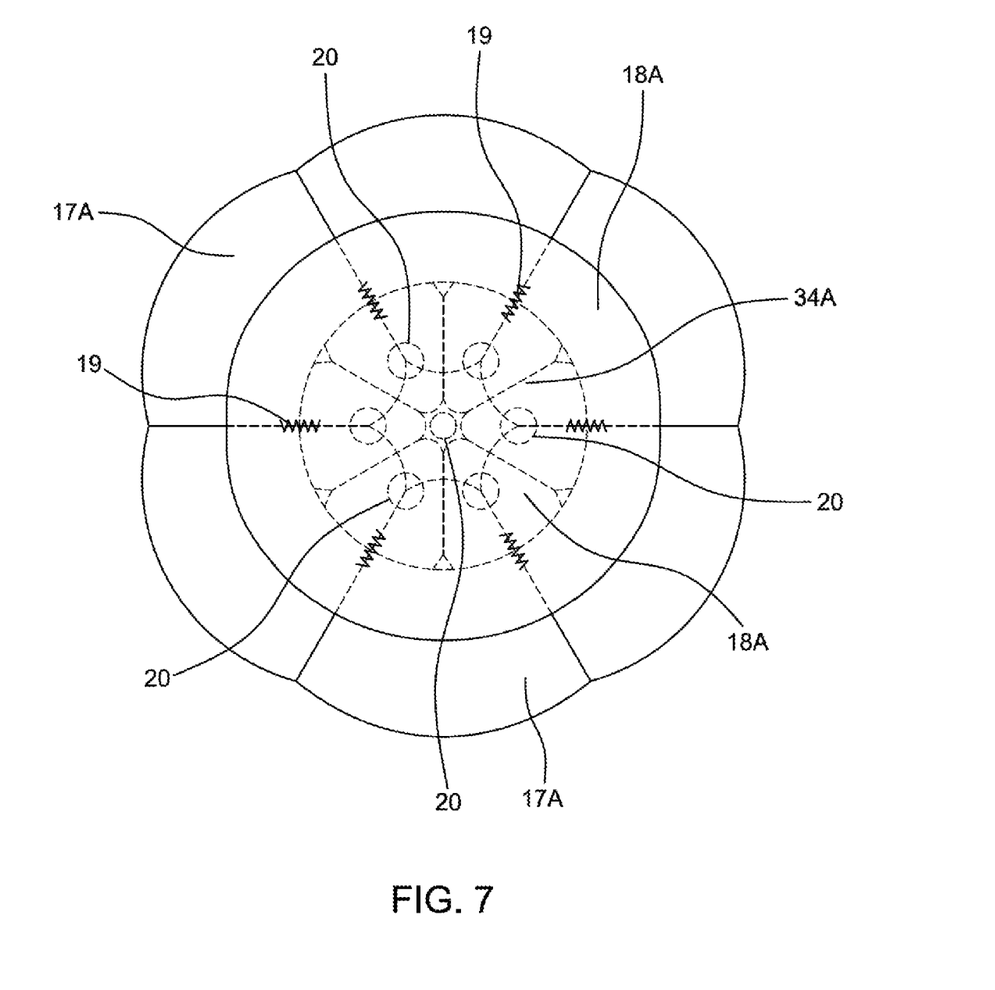
FIG. 7 is a front view of the deployed airbags from the airbag system shown in FIG. 5.

Connectors 19 attach airbags 17A of the airbag assemblies 17 together along lateral sides (see FIG. 7). This attachment provided by connectors 19, which may be ties, serves to provide the airbags 17A of airbag assemblies 17 with a joined inflated structure having the general form of a circle as shown in FIG. 7. The airbag 34A of the airbag assembly 34 inflates above this circular form provided by airbags 17A of airbag assemblies 17 as shown in FIG. 7. The airbags 18A of the airbag assemblies 18 inflate below the circular form provided by airbags 17A of airbag assemblies 17 as shown in FIG. 7.

Figure 8:
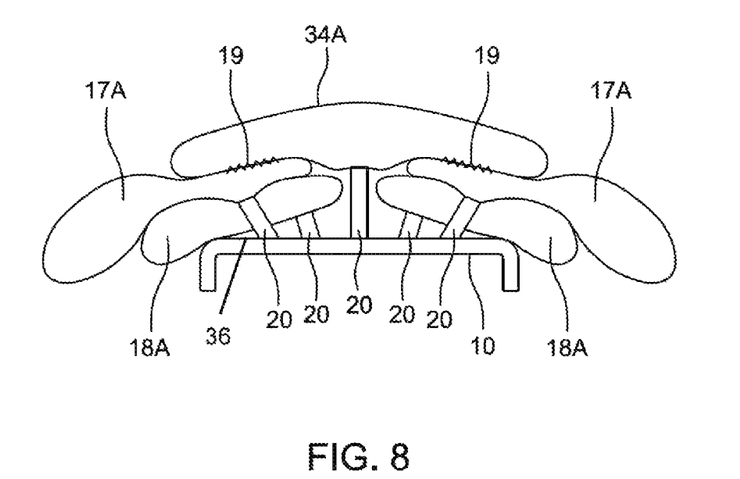
FIG. 8 is a side view of the deployed airbags from the airbag system shown in FIG. 5.

FIG. 8 shows the heights of the airbags 17A, 18A, 34A when deployed, i.e., the different levels of deployment relative to the uniformly planar (flat) upper surface 36 of the holder 10. The airbag 34A from airbag assembly 34 is at the top, immediately overlying the airbags 17A from airbag assemblies 17 which in turn immediately overlie the airbags 18A of airbag assemblies 18. There is thus an overlapping arrangement of airbags 17A, 18A, 34A.

With this inflation pattern of airbags from airbag assemblies 17, 18, 34, an improved cushioning effect may be provided to the occupant to be protected by the inflating airbags 17A, 18A, 34A. The occupant may be the driver, if the holder 10 is arranged in the core 13 of the steering wheel assembly, or may be a passenger if the holder is arranged on a dashboard or other structure in front of a passenger in a vehicle. The occupant would be protected by the outermost airbag which is supported by other airbags. By using multiple airbags in the inflation direction and also multiple airbags in different radial locations, an impacting occupant is better cushion since the flow of inflation medium is restricted. That is, when the occupant impacts the outermost airbag, the outermost airbag is restricted from being pushed inward by the presence of the intermediate and innermost airbags.

FIG. 8 also shows that it is possible to configure the airbags 17A, 18A of airbag assemblies 17, 18 to inflate toward one side, in this case, radially outward. Airbags 17A from airbag assemblies 17 are configured to inflate to extend primarily outward from the support bracket 20 on which they are mounted. Similarly, airbags 18A from airbag assemblies 18 are configured to inflate to extend primarily outward from the support bracket 20 on which they are mounted.

Although the embodiment of FIGS. 5-8 is described with respect to a driver's airbag inflating from the steering wheel assembly, the same use of different height support brackets and different sizes of airbag in airbag assembles mounted on the support brackets may be applied to different vehicular airbag arrangements that do not necessarily deploy from a steering wheel assembly. Also, it is possible to use the multiple inflators shown in FIG. 2 in or for any of the airbag assemblies 17, 18, 34 shown in FIGS. 5-8, e.g., provide two or more inflator systems mounted on the support bracket 20 for the central airbag assembly 34 and thus provide the central airbag assembly 34 with two or more airbags. Also, it is possible to use belts 21 as shown in FIGS. 3 and 4 over and around any or all of the airbags deploying from the airbag assemblies 17, 18 and 34 shown in FIGS. 5-8. More generally, the features of any of the embodiments herein may be used with any of the other embodiments herein.

Figure 9:
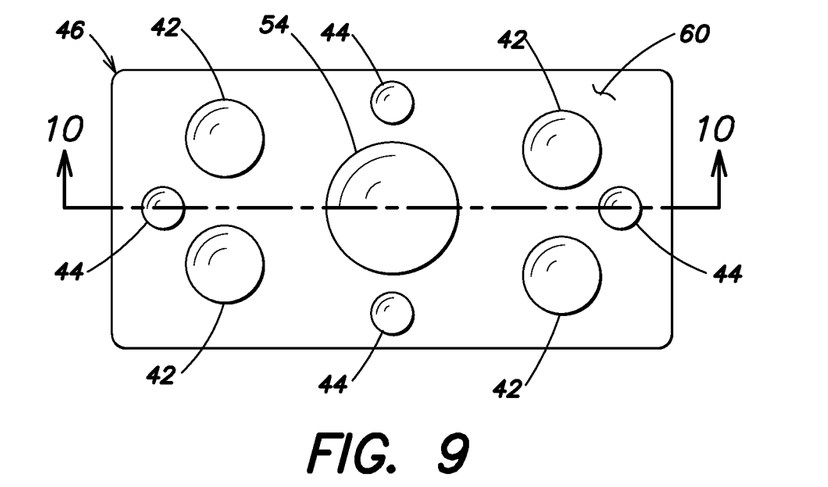
FIG. 9 is a view of an airbag assembly in accordance with the invention for use as, e.g., a passenger side airbag, with the cover removed to show the positioning of the airbags.

Referring now to FIGS. 9-12, another embodiment of an airbag system 40 is illustrated wherein different sized and shaped airbags are inflated in an overlapping relationship. FIG. 9 shows a plurality of airbag assemblies 42, 44 arranged on a holder 46 of the airbag system 40. The holder 46 may be part of a dashboard, instrument panel, instrument console or other frame of the vehicle. Generally, the holder 46 represents a mounting surface to which the airbag assembles 42, 44 can be mounted. For example, if airbag system 40 is used to protect the front-seated passenger, then the airbag system could be housed behind a cover 48 (see FIG. 10), and attached to a front vehicle support panel. The holder 46 is not required to be a unitary element and may be made of different parts or modular. Its function is to enable the airbag assemblies 42, 44 to be at different levels or heights relative to a plane defined by or through the holder 46.

Figure 11:
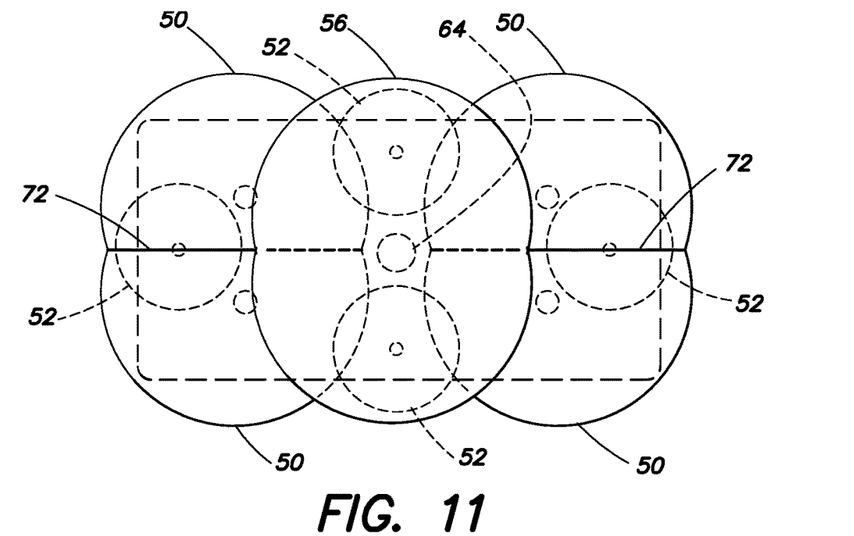
FIG. 11 is a front view of the deployed airbags from the airbag system shown in FIG. 9.

Airbags 50 in airbag assemblies 42 are larger airbags that are configured to inflate into a generally semi-circular shape (see FIG. 11) while airbags 52 in airbag assemblies 44 are smaller airbags that are also configured to inflate into a generally circular shape (see FIG. 11). A central airbag assembly 54 includes an airbag 56 that is configured to inflate into a circular shape (see FIG. 11).

Each airbag assembly 42, 44, 54 also includes an inflator system controlled by a control system, not shown in this embodiment. Instead of individual inflator systems, two or more of the airbag assemblies 42, 44, 54 may have a common inflator system. In one embodiment, there may be a single inflator system with regulator valves that are controlled to provide inflating medium from a source thereof to only those airbag assemblies whose airbags have been determined to be inflated.

The control system may be configured to inflate one (e.g., only airbag 56 via its inflator system), all of airbags 50, 52, 56 or any number therebetween. Any known airbag control system known to those skilled in the art of airbag deployment may be used in the invention.

Support brackets 58, 62, 64 are provided to support the airbag assemblies 42, 44, 54 vertically above the uniformly planar upper surface 60 of the holder 46. Also, each airbag assembly 42, 44, 54 includes an inflator to inflate the airbag thereof. By uniformly planar, it is meant that the upper surface 60 is substantially flat. Variations in the degree of flatness are possible, as would be understood by those skilled in the art to which this invention pertains. As an alternative to providing a flat upper surface, it is possible to provide the support brackets 58, 62, 64 at different heights relative to a common actual or virtual plane. The important aspect of this embodiment may be considered that, relative to a common plane a set distance from the center of impact of the airbags with the occupant, the airbags have their maximum inflation state at different distances from the common plane. Using the holder 46 with its uniformly planar upper surface 60 and different sized support brackets 58, 62, 64 attached to or integrated into this surface 60 or holder 46 is not the only way to achieve this objective and other, equivalents ways are encompassed within the scope and spirit of the invention.

FIG. 9 shows a pattern in which the airbag assemblies 42, 44, 54 are arranged. In the center, there is the airbag assembly 54 on support bracket 64 which is configured to inflate as the uppermost airbag 56, e.g., the airbag at the greatest height from the plane of the holder 46 (see FIG. 12). Radially outward from the support bracket 64 on which the central airbag assembly 54 is mounted, there are four support brackets 62 on which four airbag assemblies 42 are mounted (and from which intermediate height airbags 50 deploy, these airbags 50 being at least partly or entirely at a height below the airbag 56 and at least partly or entirely above the airbags 52). Support brackets 62 are arranged two on each lateral side of the central support bracket 64 and two on each vertical side of the central support bracket 64 so that there is one in each quadrant with the central support bracket 64 at the center. Note that since airbags 50 extend to the side of airbag 56 (see FIG. 11), only part of airbags 50 will certainly be below airbag 56. The exact degree of overlying of airbags 50 relative to airbag 56 depends on the shape and construction of the airbags 50, 56.

In a horizontal line including the central support bracket 64, there are two support brackets 58, one on each side of the central support bracket 64, and in a vertical line including the central support bracket 64, there are also two support brackets 58, one on each side of the central support bracket 64 (see FIG. 9). Support brackets 58 that support airbag assemblies 44 are optional. From airbag assemblies 44, the lower height airbags 52 deploy, these airbags 52 being at a height below the airbag 56 and below the airbags 50 which are themselves at least partly below airbag 56. Also, instead of four support brackets 58 for supporting four airbag assemblies 44, a different number of support brackets and airbag assemblies may be used. There may also be a different number of airbag assemblies 42 and a corresponding number of support brackets 62. Note that since airbags 52 directly below airbag 56 may extend between and to the sides of adjacent airbags 50 (see FIG. 11), only part of these airbags 52 will certainly be below airbag 50. The exact degree of overlying of these airbags 52 relative to airbags 50 depends on the shape and construction of the airbags 50, 52. On the other hand, some of airbags 52 may be entirely below one or more of the airbags 50, e.g., the airbags 52 on the left and right sides as shown in FIG. 11.

Figure 10:
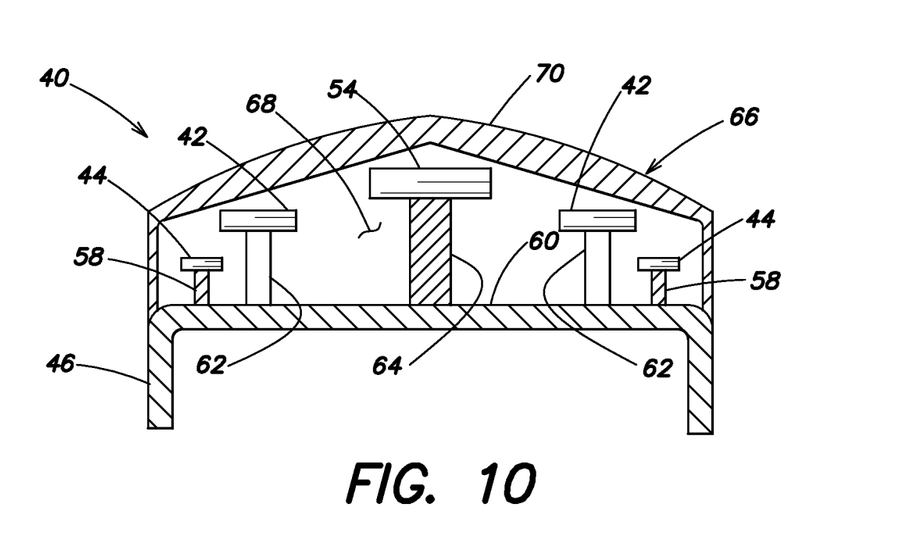
FIG. 10 is a cross-sectional view of the airbag assembly shown in FIG. 9 taken along the line 10-10 in FIG. 6.

FIG. 10 shows a housing 66 of the airbag system 40 which defines an interior chamber 68 between the holder 46 and a cover 70. The airbag assemblies 42, 44, 54 and the support brackets 58, 62, 64 are situated at least partly and possibly entirely in this chamber 68. In view of the partial or complete enclosure of the airbag assemblies 42, 44, 54 in the chamber 68 of the housing 66, this design is particularly suited for a single occupant airbag, i.e., an occupant in a single seating position of the vehicle. Thus, when the housing 66 is incorporated into a part of the vehicle in front of the front-seated passenger, then the airbag system would protect only the front-seated passenger. When the housing 66 is incorporated into a part of the vehicle in front of a rear-seated passenger, e.g., in the back portion of the front seat, then the airbag system would protect only one rear-seated passenger. Cover 70 is broken or removed when the airbags deploy, see FIG. 12.

Figure 12:
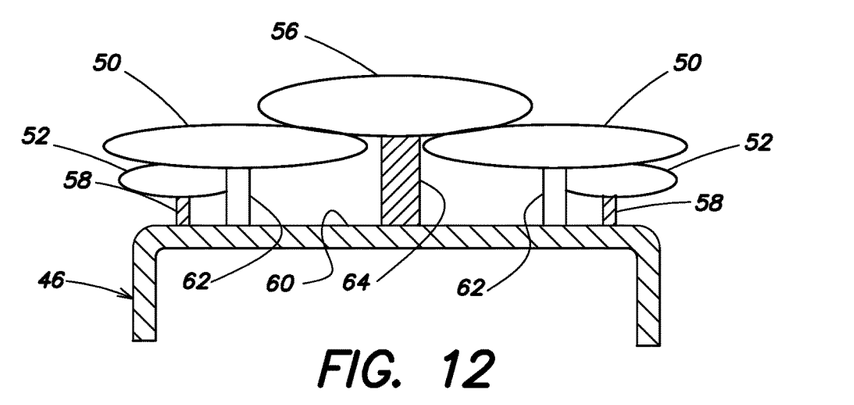
FIG. 12 is a side view of the deployed airbags from the airbag system shown in FIG. 9.

Connectors 72 attach airbags 50 of the airbag assemblies 42 together along adjoining sides (see FIG. 11). This attachment provided by connectors 72, which may be ties, serves to provide the airbags 50 of airbag assemblies 42 on each side of the central support bracket 64 with a joined inflated structure having the general form of a circle as shown in FIG. 11. The airbag 56 of the airbag assembly 54 inflates above these circular forms provided by airbags 50 of airbag assemblies 42 as shown in FIG. 12. The airbags 52 of the airbag assemblies 44 inflate below the circular forms provided by airbags 50 of airbag assemblies 42 as shown in FIG. 12.

FIG. 12 shows the heights of the airbags 50, 52, 56 when deployed, i.e., the different levels of deployment relative to the uniformly planar (flat) upper surface 60 of the holder 46. The airbag 56 from airbag assembly 54 is at the top, immediately overlying the airbags 50 from airbag assemblies 42 which in turn immediately overlie the airbags 52 of airbag assemblies 44.

An overlapping arrangement of airbags 50, 52, 56 is thus provided, with multiple airbags of these overlapping airbags deploying in the same direction. This construction of airbags deploying in an overlapping manner in the same direction differs from arrangements wherein one airbag deploys from a surface in front of the occupant and another airbag deploys from a surface to the side of the occupant, deployment of airbags in two different, possibly perpendicular directions. Indeed, an important aspect of some embodiments of the invention is that multiple airbags deploy in the same direction toward an occupant and from different heights to create the overlapping airbags. Overlapping airbags may be designed to provide greater resistance to the occupant's motion, and thus improved cushioning effect. Also, if one airbag is faulty and does not deploy, there will still be an airbag against which the occupant impacts thereby ensuring at least some protection of the occupant in the event of a crash or other event requiring airbag deployment.

As an example, when the occupant is the front-seated passenger, the holder 46 is arranged in or on the dashboard or other structure in front of a passenger in a vehicle. The occupant would be protected by the outermost airbag (airbag 56) which is supported by other airbags (one or more of airbags 50, 52). By using multiple airbags in the same inflation direction and also multiple airbags in different radial locations, an impacting occupant is better cushion since the flow of inflation medium is restricted. That is, when the occupant impacts the outermost airbag (airbag 56), the outermost airbag is restricted from being pushed inward by the presence of the intermediate and innermost airbags (airbags 50, 52).

Although the embodiment of FIGS. 9-12 is described with respect to a front-seated passenger's airbag not mounted on a steering wheel, the same use of different height support brackets and different sizes of airbag in airbag assemblies mounted on the support brackets may be applied to different vehicular airbag arrangements that deploy from a different surface of the passenger compartment. Also, it is possible to use the multiple inflators shown in FIG. 2 in or for any of the airbag assemblies 42, 44, 54 shown in FIGS. 9-12, e.g., provide two or more inflator systems mounted on the support bracket 58 for the central airbag assembly 54 and thus provide the central airbag assembly 54 with two or more airbags. Also, it is possible to use belts 21 as shown in FIGS. 3 and 4 over and around any or all of the airbags deploying from the airbag assemblies 42, 44, 54 shown in FIGS. 9-12.

The use of multiple inflator systems and airbags as exemplified by the system shown in FIG. 2, the use of belts 21 to limit airbag expansion as exemplified by the system shown in FIGS. 3 and 4 and the multi-level airbag arrangement as exemplified by the system shown in FIGS. 5-12 are useful for the driver, passenger and rear seat airbag systems. It is often the case that children are placed in a child seat in either the front passenger seat or in a rear seat. Even if the child seat is properly installed, a deploying airbag has an overwhelming force that can injure and potentially kill a child in such a child seat. The invention can effectively address this potential for harm by limiting the expansion/inflation of the airbag to thereby reduce the deployment force against the child seat yet be able to provide a sufficient cushioning effect for other types of seat occupancy than would result in movement of the occupant forward into contact with the airbag.

Thus, embodiments wherein the airbag systems of FIGS. 2-12 are installed in a headrest of a first seat of a vehicle for use by an occupant of a second seat behind the first set are considered part of the invention. Similar installation in the door or trim panels or dashboard of a vehicle is also encompassed within the scope and spirit of the invention.

Figure 13:
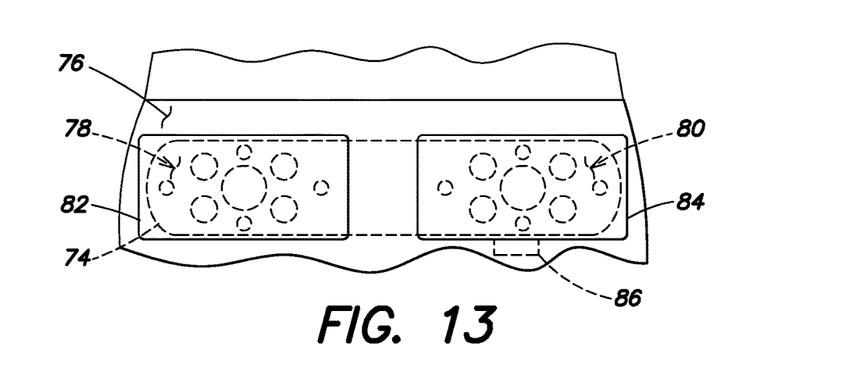
FIG. 13 is a view of a vehicle surface of an autonomous vehicle in which the airbag system includes two sets of overlapping airbags.

The embodiments of the airbag system disclosed above are preferably designed for protecting a single occupant. This is not a limitation though and it is possible to design an airbag system with two sets of overlapping airbags, one set for protecting one occupant, e.g., the driver, and the other set for protecting another occupant, e.g., a front-seated passenger. As shown in FIG. 13, in such an embodiment, there may be a single holder 74 underneath or behind the vehicle surface 76 with two sets 78, 80 of different height support brackets and airbag assemblies on the support brackets in accordance with the teachings above.

There may typically be a cover 82, 84 in the vehicle surface 76 in front of the driver and the passenger, respectively, which can be displaced or otherwise eliminated before or during airbag deployment. Such an embodiment may be useful for an autonomous vehicle wherein there is no steering wheel. A control system 86 is connected to the airbag assemblies on both sets 78, 80 of support brackets and designed to control deployment of any number of the airbag assemblies dependent on the programmed control scheme, e.g., which is based on the magnitude of the crash, the location of the impact, the number of occupants, the morphology of the occupants, and any other criteria used for airbag deployment control. Additional airbag assemblies may be provided on the holder 74, whether mounted on support brackets or directly onto the holder 74.

All of the other variations of the airbag systems disclosed above may be applied to the embodiment disclosed in FIG. 13, and vice versa.

It is mentioned above that each airbag assembly includes an inflatable airbag. It is possible however to include multiple airbags in each airbag assembly and thus multiple airbags on each support bracket. Also, it is possible to provide for the different airbag height deployment by controlling timing of the deployment of the airbags without necessitating different height support brackets. The airbags may all be positioned at the same or similar level and through ordering the deployment, the same overlapping airbag effect described above is achieved. For example, the airbag to be closest to the occupant, i.e., the airbag to be farthest from the plane, is deployed first and the airbags to be farthest from the occupant, i.e., the airbags to be closest to the plane, are deployed last.

Disclosed above is therefore a vehicular airbag system including a steering column, a steering wheel assembly rotatably mounted to the steering column and including a core, and a plurality of airbags arranged in the core and configured to inflate outward from the core. The airbags are nested such that each airbag is configured to inflate within or over at least one other airbag. A plurality of activatable inflator systems is configured to inflate a respective airbag at a different speed of inflation. A control system is coupled to the inflator systems and controls activation of the inflator systems and thus inflation of the airbags. The inflator systems are configured such that one of the inflator systems configured to inflate an innermost one of the airbags has a highest speed of inflation of the inflator systems and one of the inflator systems configured to inflate an outermost one of the airbags has a lowest speed of inflation of the inflator system.

Retainers are provided in the housing of the core and each retains a respective inflator system. The retainers include a lower wall and a preferably tubular side wall extending upward from an outer edge of the lower wall. Each airbag is attached to the side wall of a respective retainer. More specifically, the system includes a first retainer that retains a first one of the inflator systems that inflates an outermost inflating one of the airbags, and second retainer that retains a second one of the inflator systems that inflates another one of the airbags and is connected to the first one of the inflator systems.

If three airbags are provided, e.g., an outermost airbag, an intermediate airbag and an innermost airbag, the system includes a first retainer that retains a first one of the inflator systems that inflates the outermost airbag, and a second retainer that retains a second one of the inflator systems that inflates the intermediate airbag and is connected to the first one of the inflator systems. The second retainer is inward of and spaced apart from the first retainer to define an annular space between the first and second retainers through which inflation medium from the first one of the inflator systems flows to inflate the outermost airbag. A third retainer retains a third one of the inflator systems that inflates the innermost airbag and is connected to the second one of the inflator systems. The third retainer is inward of and spaced apart from the second retainer to define an annular space between the second and third retainers through which inflation medium from the second one of the inflator systems flows to inflate the intermediate airbag.

Another embodiment of a vehicular airbag system for a driver in accordance with the invention includes a steering column, a steering wheel assembly rotatably mounted to the steering column and including a core, at least one airbag arranged in the core and configured to inflate outward from the core, at least one inflator system configured to inflate a respective airbag, and a control system coupled to the at least one inflator system to control activation of the at least one inflator system and thus inflation of the at least one airbag. A plurality of elongate belts are arranged in the core around the at least one airbag and having a predetermined length or expansion limit to limit inflation of the at least one airbag.

The belts may include first and second sets of belts, wherein the belts in the first set are configured to extend across the at least one airbag from a first side to an opposite second side at an angle to the belts in the second set which are configured to extend across the at least one airbag from a third side different than the first and second sides to an opposite fourth side.

A holder is arranged in the core for retaining the at least one airbag, both ends of the belts being attached to the holder. If multiple airbags are provided, they may be nested such that each of the airbags is configured to inflate within or over at least one other of the airbags. The belts extend over and around the outermost airbag. In this case, the at least one inflator system comprises a plurality of inflator systems, each configured to inflate a respective airbag at a different speed of inflation. Also, the inflator system is configured such that one of the inflator systems is configured to inflate an innermost airbag has a highest speed of inflation of the inflator systems and one of the inflator systems is configured to inflate an outermost airbag has a lowest speed of inflation of the inflator system. Intermediate airbags are inflated at a speed less than the immediate innerlying airbag and greater than the immediate overlying airbag.

Yet another embodiment of a vehicular airbag system for a driver in accordance with the invention includes a steering column, a steering wheel assembly rotatably mounted to the steering column and including a core and a holder in the core, and a plurality of airbag support brackets arranged on the holder each retaining an airbag assembly having an inflator system and an airbag configured to inflate outward from the core when inflated by the inflator system. The support brackets have different heights relative to a uniformly planar upper surface of the holder such that the airbags inflate at different levels relative to the holder.

In one embodiment, a first set of the airbag assemblies includes a large airbag and a second set of the airbag assemblies includes a small airbag. The airbags may be generally triangular. Connectors are optionally provided for connecting sides of the airbags of the first set of airbag assemblies together. The support brackets for the first set of airbag assemblies are arranged in a circle to provide a circular airbag formed from the airbags of the first set of airbag assemblies.

In a specific embodiment, the first set of airbag assemblies includes six airbag assemblies distributed equiangularly around the upper surface of the holder. The airbags of the second set of the airbag assemblies are configured to be inflated at a level closer to the upper surface of the holder than the airbags in the first set of airbag assemblies. As such, the support brackets for the second set of airbag assemblies are shorter in height relative to the upper surface of the holder than the support brackets for the first set of airbag assemblies.

If the second set of airbag assemblies includes six airbag assemblies distributed equiangularly around the upper surface of the holder, then the first set of airbag assemblies can include six airbag assemblies distributed equiangularly around the upper surface of the holder and outward of the six airbag assemblies of the second set.

In most but not all conceived embodiments, one of the support brackets is arranged in a center of the upper surface of the holder and has a height taller relative to the upper surface of the holder taller than the support brackets for the first and second sets of airbag assemblies. An airbag of the airbag assembly retained on the one of the support brackets is configured to inflate above all other airbags of the airbag assemblies.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A vehicular airbag system, comprising:
a holder;
airbag assemblies, each of said airbag assemblies having an inflatable airbag; and
support brackets arranged on said holder, each of said support brackets retaining one of said airbag assemblies,
said support brackets having different heights relative to a plane defined by or through said holder and being positioned relative to one another such that said airbags inflate at different heights relative to said plane and an airbag inflating at a greatest height from said plane overlies at least one other airbag closer to said plane, and
wherein a first set of said support brackets is arranged at a first height from said plane and a second set of said support brackets is arranged at a second height from said plane different than the first height at which said first set of said support brackets is arranged, each of said first and second sets of said support brackets including a plurality of said support brackets.

2. The airbag system of claim 1, further comprising a housing including a cover, a chamber being defined between said cover and said holder, said support brackets and said airbag assemblies being situated in said chamber.

3. The airbag system of claim 1, wherein said holder includes a uniformly planar surface defining said plane, said support brackets having the different heights relative to said planar surface of said holder such that said airbags inflate at the different heights relative to said planar surface.

4. The airbag system of claim 1, wherein each of said airbag assemblies further includes an inflator system for inflating said airbag of said airbag assembly.

5. The airbag system of claim 1, wherein said first and second sets of support brackets are arranged on said holder to cause said airbags of said airbag assemblies retained by said first set of said support brackets to inflate over said airbags of said airbag assemblies retained by said second set of said support brackets.

6. The airbag system of claim 1, wherein the airbag system deploys said airbags to protect a single occupant of a vehicle.

7. The airbag system of claim 1, wherein a central one of said support brackets is arranged in a center of said holder, said airbag assembly retained by said central one of said support brackets in the center of said holder including said airbag that inflates at the greatest height from said plane.

8. The airbag system of claim 7, wherein said support brackets of said first set of said support brackets are arranged radially outward from said central one of said support brackets, said airbag assemblies retained by said support brackets of said first set of said support brackets each including said airbag that inflates at least partially below said airbag that inflates from said airbag assembly on said central one of said support brackets.

9. The airbag system of claim 8, wherein said said support brackets of said first set of said support brackets have the first height being less than a height of said central one of said support brackets from said plane.

10. The airbag system of claim 8, wherein said support brackets of said second set of said support brackets retain said airbag assemblies that each include said airbag that inflates at least partially below at least one of said airbags that inflate from said airbag assemblies on said support brackets of said first set of said support brackets.

11. The airbag system of claim 10, wherein the second height is less than the first height.

12. The airbag system of claim 1, wherein the first height is larger than the second height, and a first set of said airbag assemblies is retained on said first set of said support brackets.

13. The airbag system of claim 12, wherein said airbags of said airbag assemblies retained on said first set of said support brackets are larger than said airbags of said airbag assemblies retained on said second set of said support brackets.

14. The airbag system of claim 13, wherein an additional one of said support brackets is arranged in a central location on said holder inward of said first and second sets of said support brackets and that supports a central airbag assembly including said airbag that inflates into a circular shape.

15. The airbag system of claim 14, wherein said airbag of said central airbag assembly inflates above said airbags of said airbag assemblies retained on said first and second sets of said support brackets and constitutes said airbag that inflates at the greatest height from said plane.

16. In a vehicle having a plurality of seating positions, an airbag system for protecting an occupant in only one of the seating positions and which comprises:
a housing defining a chamber;
airbag assemblies arranged in said chamber, each of said airbag assemblies including an airbag that inflates outward; and
support brackets arranged in said chamber, each of said support brackets retaining at least one of said airbag assemblies, said support brackets having different heights relative to a plane defined by or through said housing such that said airbags inflate at different heights relative to said plane, said housing including a uniformly planar surface defining said plane,
wherein a first set of said support brackets is arranged at a first height from said plane and a second set of said support brackets is arranged at a second height from said plane different than the first height at which said first set of said support brackets is arranged, each of said first and second sets of said support brackets including a plurality of said support brackets.

17. The vehicle of claim 16, wherein the first height is larger than the second height, and a first set of said airbag assemblies is retained on said first set of said support brackets.

18. The vehicle of claim 16, wherein said airbags of said airbag assemblies inflate at different heights relative to said plane and said airbag inflating at a greatest height from said plane overlies at least one other airbag closer to said plane.

19. The vehicle of claim 18, wherein a central one of said support brackets is arranged in a center of said housing, said airbag assembly retained by said central one of said support brackets in the center of said housing including said airbag that inflates at the greatest height from said plane.

20. A vehicular airbag system, comprising:
a holder;

airbag assemblies, each of said airbag assemblies having an inflatable airbag; and support brackets arranged on said holder, each of said support brackets retaining one of said airbag assemblies, said support brackets having different heights relative to a plane defined by or through said holder and being positioned relative to one another such that said airbags inflate at different heights relative to said plane and an airbag inflating at a greatest height from said plane overlies at least one other airbag closer to said plane, and wherein said support brackets provide the different heights relative to said plane and are arranged on said holder to cause said airbags to inflate over one another.

21. A vehicular airbag system, comprising:

a holder;

airbag assemblies, each of said airbag assemblies having an inflatable airbag; and support brackets arranged on said holder, each of said support brackets retaining one of said airbag assemblies, said support brackets having different heights relative to a plane defined by or through said holder and being positioned relative to one another such that said airbags inflate at different heights relative to said plane and an airbag inflating at a greatest height from said plane overlies at least one other airbag closer to said plane, wherein a central one of said support brackets is arranged in a center of said holder, said airbag assembly retained by said central one of said support brackets in the center of said holder including said airbag that inflates at the greatest height from said plane, wherein a first plurality of said support brackets are arranged radially outward from said central one of said support brackets, said airbag assemblies retained by said first plurality of said support brackets each including said airbag that inflates at least partially below said airbag that inflates from said airbag assembly on said central one of said support brackets, and wherein said first plurality of said support brackets have a height less than a height of said central one of said support brackets.

22. A vehicular airbag system, comprising:

a holder;

airbag assemblies, each of said airbag assemblies having an inflatable airbag; and support brackets arranged on said holder, each of said support brackets retaining one of said airbag assemblies, said support brackets having different heights relative to a plane defined by or through said holder and being positioned relative to one another such that said airbags inflate at different heights relative to said plane and an airbag inflating at a greatest height from said plane overlies at least one other airbag closer to said plane, wherein a central one of said support brackets is arranged in a center of said holder, said airbag assembly retained by said central one of said support brackets in the center of said holder including said airbag that inflates at the greatest height from said plane, wherein a first plurality of said support brackets are arranged radially outward from said central one of said support brackets, said airbag assemblies retained by said first plurality of said support brackets each including said airbag that inflates at least partially below said airbag that inflates from said airbag assembly on said central one of said support brackets, wherein a second plurality of said support brackets retain said airbag assemblies that each include said airbag that inflates at least partially below at least one of said airbags that inflate from said airbag assemblies on said first plurality of said support brackets, and wherein said second plurality of said support brackets have a height less than a height of said first plurality of said support brackets.

* * * * *

UNITED STATES PATENT AND TRADEMARK OFFICE
CERTIFICATE OF CORRECTION

PATENT NO. : 10,773,677 B1
APPLICATION NO. : 16/117555
DATED : September 15, 2020
INVENTOR(S) : Michael Kipnis Page 1 of 1

It is certified that error appears in the above-identified patent and that said Letters Patent is hereby corrected as shown below:

In the Claims

Claim 19, Column 14, Line 1, change "said said" to --said--.

Signed and Sealed this
Twentieth Day of October, 2020

Andrei Iancu
*Director of the United States Patent and Trademark Office*